May 28, 1935. H. E. WHITE 2,002,990
VEHICLE BRAKE
Filed Aug. 14, 1931 9 Sheets-Sheet 1

Fig.1.

Inventor
Herbert E. White,
By
Attorney

May 28, 1935. H. E. WHITE 2,002,990
VEHICLE BRAKE
Filed Aug. 14, 1931 9 Sheets-Sheet 2

Inventor
Herbert E. White,
By
Attorney

Inventor
Herbert E. White,
By
Attorney

May 28, 1935.  H. E. WHITE  2,002,990
VEHICLE BRAKE
Filed Aug. 14, 1931  9 Sheets-Sheet 5

Inventor
Herbert E. White,
By
Attorney

Inventor
Herbert E. White,
By
Attorney

May 28, 1935.  H. E. WHITE  2,002,990
VEHICLE BRAKE
Filed Aug. 14, 1931   9 Sheets-Sheet 7

Inventor
*Herbert E. White,*

By

Attorney

May 28, 1935.  H. E. WHITE  2,002,990
VEHICLE BRAKE
Filed Aug. 14, 1931  9 Sheets-Sheet 8

Inventor
Herbert E. White,

May 28, 1935.  H. E. WHITE  2,002,990
VEHICLE BRAKE
Filed Aug. 14, 1931   9 Sheets-Sheet 9

Patented May 28, 1935

2,002,990

UNITED STATES PATENT OFFICE 2,002,990

VEHICLE BRAKE

Herbert E. White, Cleveland, Ohio, assignor to Truscon Steel Company, Youngstown, Ohio, a corporation of Michigan Application August 14, 1931, Serial No. 557,168

5 Claims. (Cl. 188—72)

The increase in the weight and in the speed of motor vehicles has created a very serious problem in providing adequate means for braking such vehicles. The space available for the installation of the brakes is limited and the area of the braking surfaces now in general use is relatively small.

The primary object of the present invention is to provide brake mechanism of a decidedly simple and compact form which will secure a relatively great amount of frictional braking surface, and in which the braking action can be varied with a delicacy that will slow down or bring to a standstill the vehicle with ease and smoothness and yet if necessary, with expedition.

A further object is to provide a structure that can be readily installed, is quickly available for inspection and repair, will automatically take up wear and is capable of having readily added thereto or subtracted therefrom braking elements to readily vary the amount of braking action or resistance to suit the conditions of the particular vehicle on which the mechanism is employed.

Figure 1:
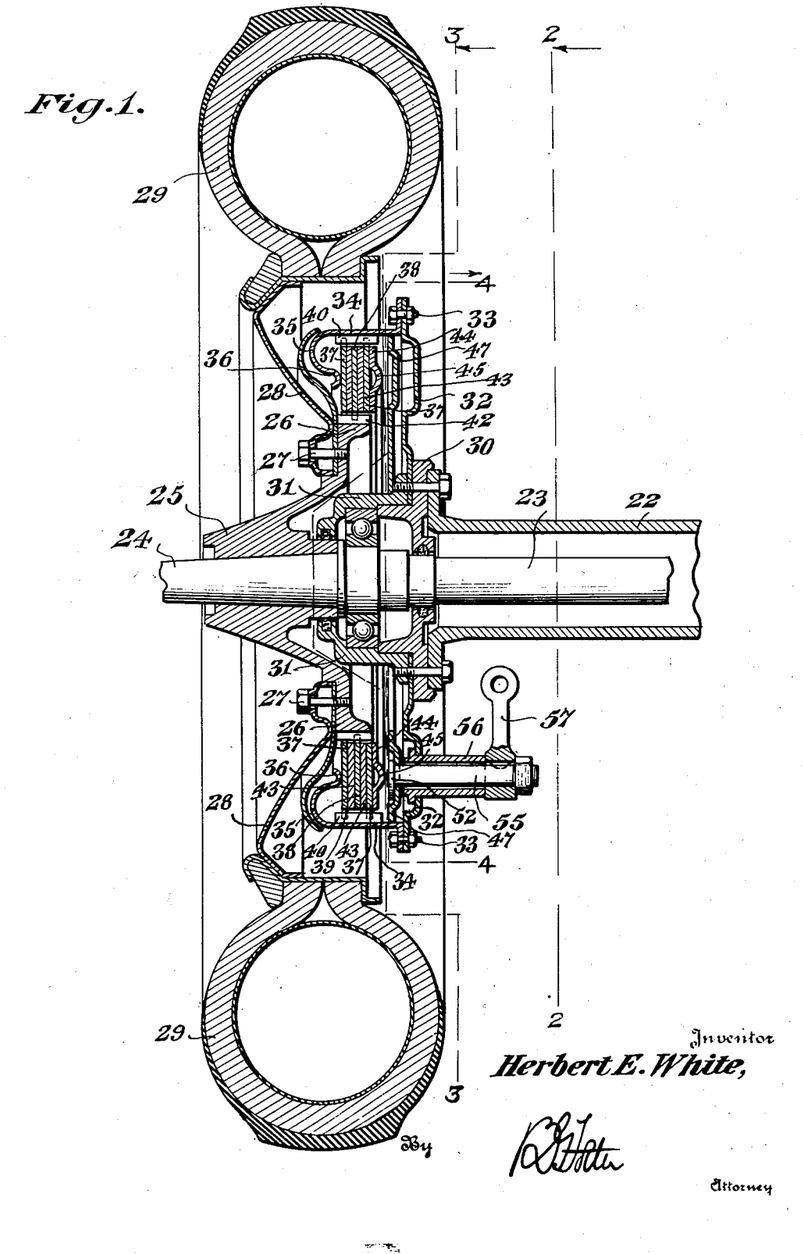
Figure 1 is a vertical longitudinal sectional view through a portion of a shaft housing and automobile wheel equipped with an embodiment of the invention that is at present considered the preferable one.
Figure 2:
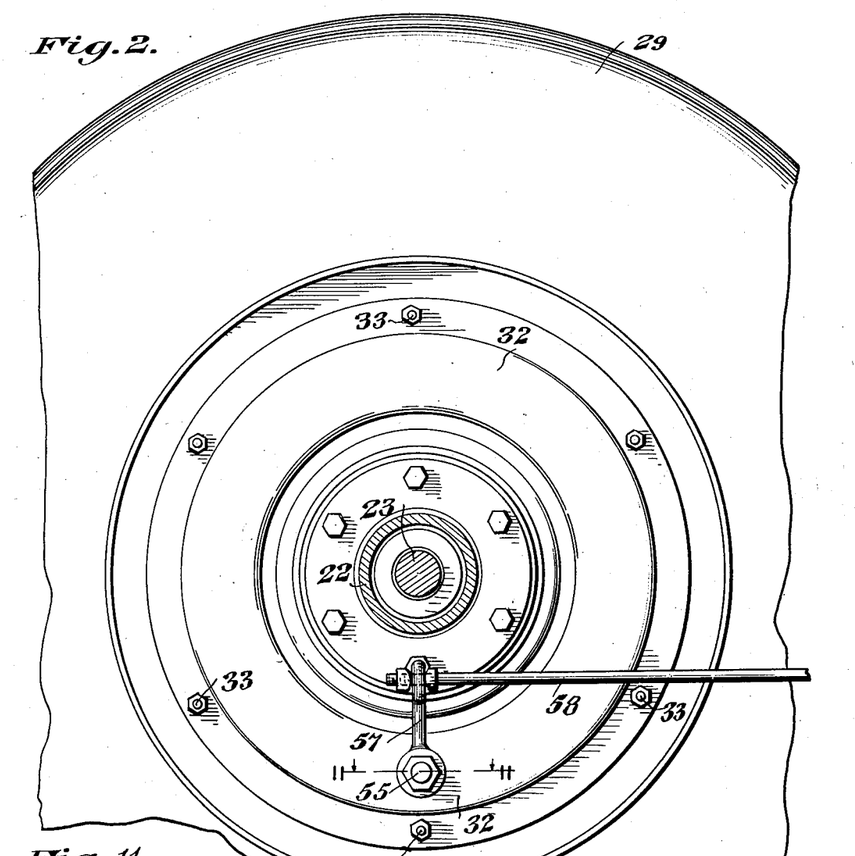
Figures 2 and 3 are sectional views respectively on the lines 2—2 and 3—3 of Figure 1, looking in the direction of the arrows.
Figure 3:
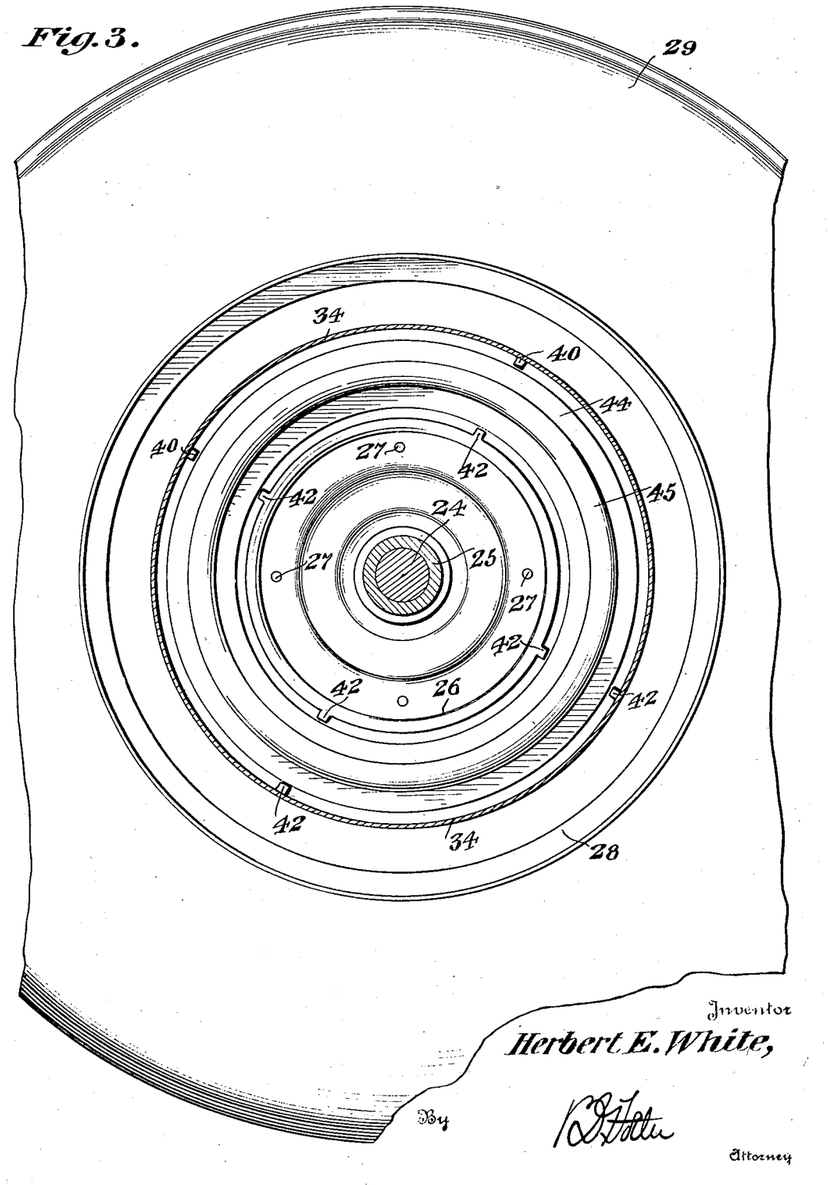

In the embodiment first disclosed, a portion of an axle housing is shown at 22, in which is journaled a rotatable axle 23 having a projecting spindle 24 on which is mounted a rotatable vehicle wheel. This wheel comprises a hub 25 having a rearwardly and outwardly extending flange portion 26. Detachably secured to the outer side of said flange portion by bolts 27 is a wheel body 28 carrying peripheral means for receiving and holding the usual pneumatic tire 29. The type of the wheel body is of course relatively immaterial.

Secured to the outer end of the axle housing 22 is a fixed collar 30 carrying an anti-friction ball bearing sleeve 31, and clamped between this sleeve 31 and the collar 30 is the inner side wall 32 of a brake housing. The peripheral margin of this wall has secured to it by bolts 33 or other fasteners the peripheral wall 34 of said brake housing, and this peripheral wall has an inturned outer portion 35 forming the outer side wall of the brake housing. The wall 35, it will be observed, has its inner margin inset to provide an annular rounded rib 36.

The flange portion 26 of the wheel hub extends into the housing or in other words beyond the wall 35, and is in opposition to and spaced from the peripheral wall 34. In this space and therefore in the brake housing are a plurality of relatively rotatable interleafed brake plates in the form of flat metal disks 37 and 38. In the present embodiment but three disks are employed, but this number may obviously be increased. The outer disks 37 are provided in their peripheries with notches 39 that receive holding lugs 40 formed on the internal sides of the peripheral brake housing wall 34. The said disks are therefore held against rotation. The central disk 38 has in its internal margins notches 41 that receive lugs 42 formed on the peripheral flange portion 26 of the hub 25. Therefore the central brake disk rotates with the wheel. In the present form of construction the disk 38 is provided on its opposite side with suitable friction disks 43.

Figure 6:
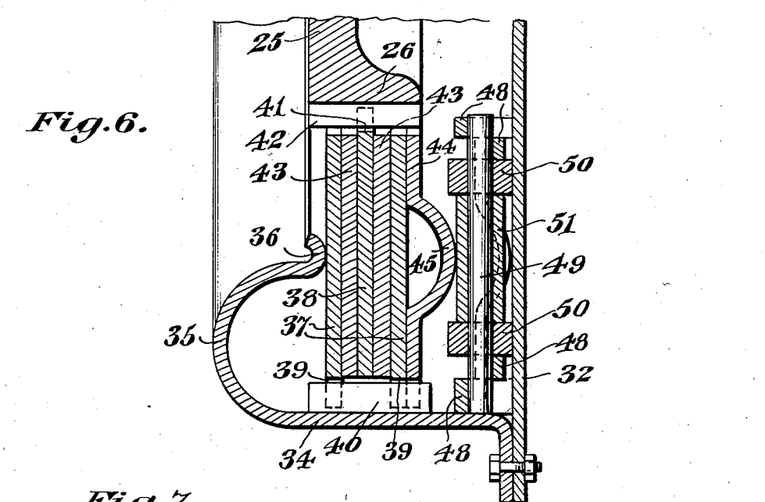
Figure 6 is a detail sectional view on an enlarged scale, but taken on the line 6—6 of Figure 4.
Figure 7:
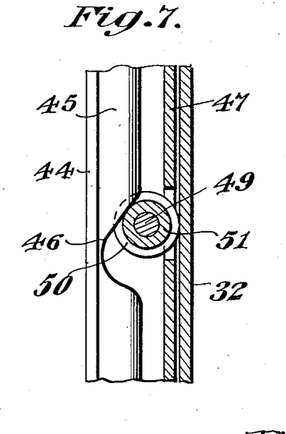
Figures 7, 8 and 9 are detail sectional views on the line 8—8 of Figure 4 and illustrating the camming action between the two pressing rings.
Figure 8:
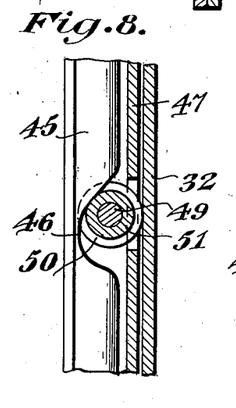
Figure 9:
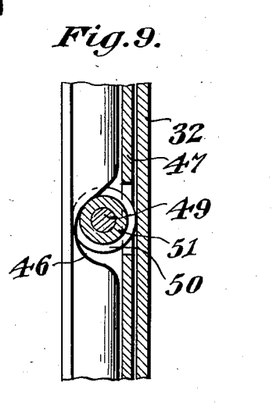
Figure 10:
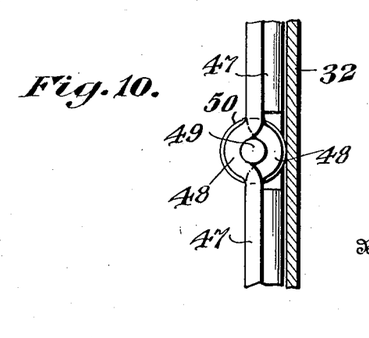
Figure 10 is a detail end elevation of the outer ring to illustrate the mounting for one of the rollers.

The outer disk 37 has an annular central bearing against the rib 36 of the outer housing wall 35, and means are provided for pressing the disks together and against the rib 36, which thus constitutes an abutment. In the present embodiment this pressing means is as follows. Against the inner face of the inner non-rotating brake disk 37 is a flat metal pressing ring 44 provided with an annular rib 45 that is preferably located midway between its inner and outer edges. This rib at intervals is pressed to provide cam tracks 46 (see Figures 7, 8 and 9. Located alongside the ring 44 is a rotatable actuating ring 47 that lies on the inner side of the inner housing wall 32. The ring 47 has struck from it at intervals oppositely curved journal straps 48 (see Figures 6 and 10). In these straps are located transversely disposed spindles 49 carrying bearing wheels 50 that ride against the inner face of the inner housing wall 32 and also carrying between said wheels 50 rollers 51 of less diameter than the wheels 50, the rollers 51 riding the cam tracks 45 of the ring 44 when the ring 47 is rotated as will be clear by reference to Figures 7, 8 and 9.

Figure 4:
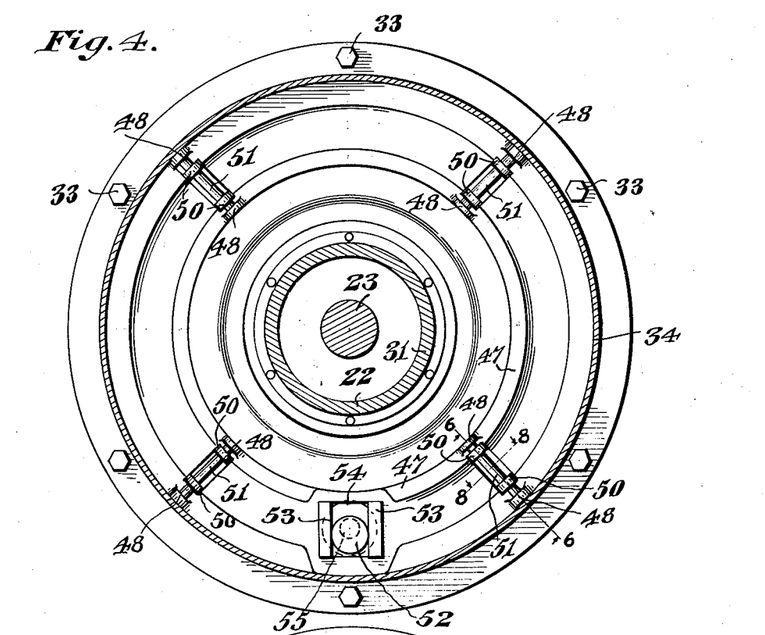
Figure 4 is a sectional view on the line 4—4 of Figure 1.
Figure 5:
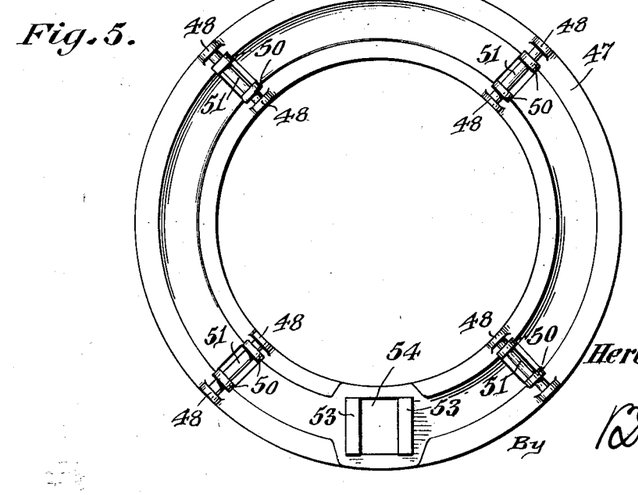
Figure 5 is a detail view of one of the outer disk-pressing rings.
Figure 11:
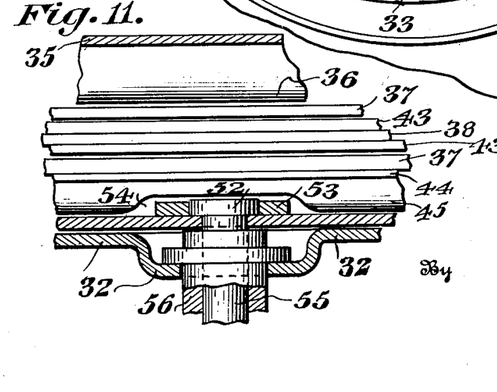
Figure 11 is a detail sectional view on the line 11—11 of Figure 2.
Figure 12:
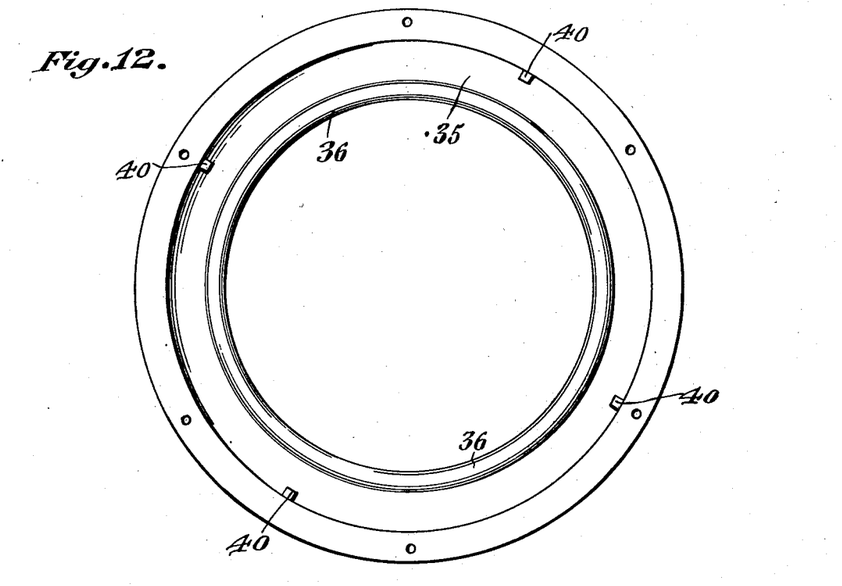
Figure 12 is a side elevation of the peripheral wall of the brake housing.
Figure 13:
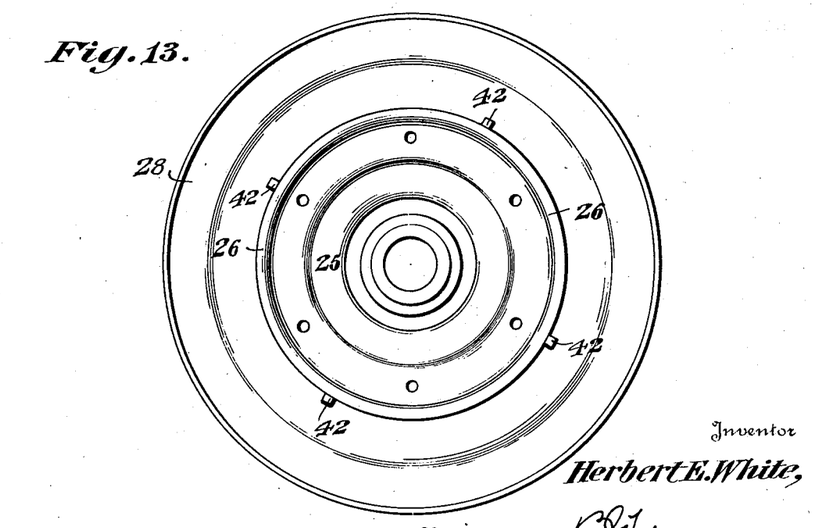
Figure 13 is a view in elevation of the wheel hub.
Figures 14, 15, 16:
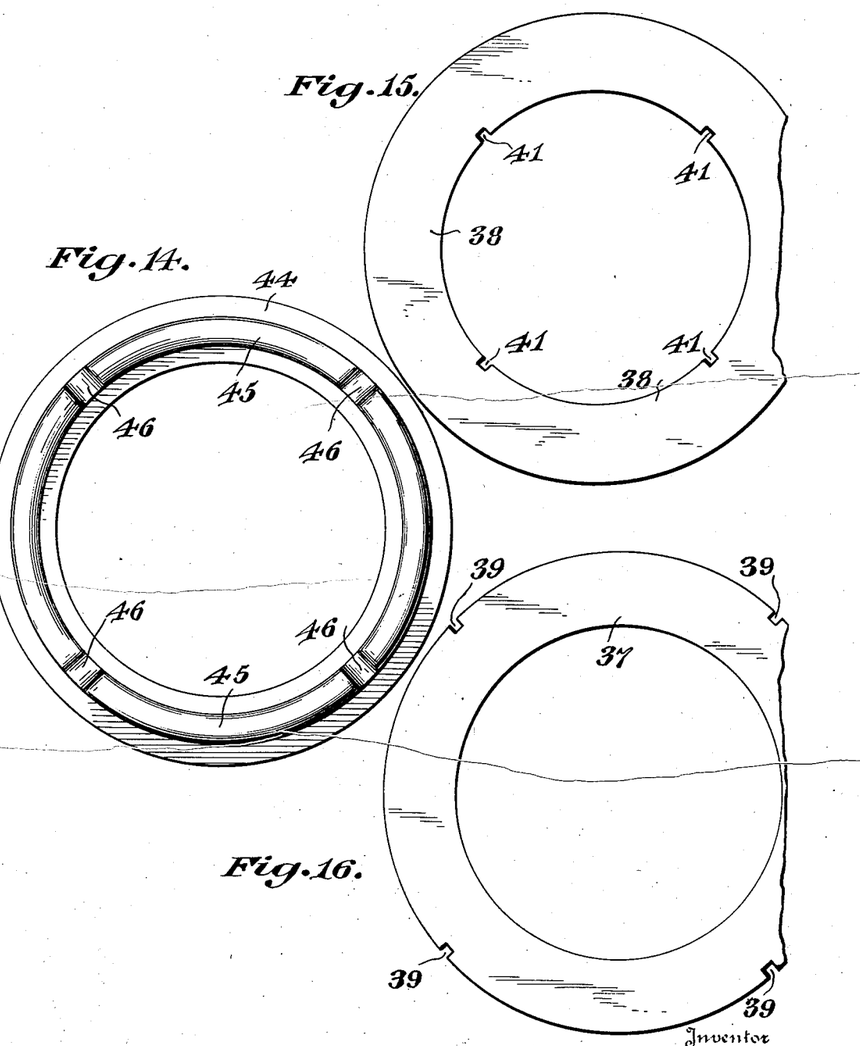
Figure 14 is a view in elevation of the cam ring for pressing the brake disks together.
Figure 15 is a view in elevation of one of the brake disks that is mounted on the wheel hub.
Figure 16 is a similar view of one of the brake disks that is mounted on the peripheral housing wall.

A partial rotation of the ring 47 is effected by an eccentric 52 which operates against bearing plates 53 secured to the ring 47 on opposite sides of an opening 54 formed in said ring, and shown particularly in Figures 4 and 11. The eccentric 52 is mounted on a rock shaft 55 journaled in a sleeve 56 that is secured to the inner housing wall 32 and this rock shaft is provided at its inner end with a crank arm 57 connected to a suitable rod or link 58 that is in turn connected to any suitable actuating mechanism.

The operation of the structure is as follows. As long as the rollers 51 are at the bottoms of the cam notches 46, the ring 44 is loose with respect to the braking disks 37 and 38. Consequently the disk 38 can rotate freely with the vehicle wheel. When, however, the crank arm 58 is turned, by operating the treadle, the brake lever, or other prime mover, the eccentric 52 is turned. This acting on one of the plates 53 turns the ring 47. This causes the rollers 51 to ride outwardly on the cam tracks 46 and press the ring 44 toward the brake disks 37 and 38, pressing these disks together and creating frictional resistance to their relative rotation, thereby braking the wheel. A reverse movement of the crank arm 57 again releases the brake disks and permits the disk 38 carried by the wheel, to again freely rotate. It will be noted that in this structure the ring 41 will lie flat against the adjacent brake disk 37, and because of the central bearings of the rollers 51 against the cam faces 46, the ring 41 can give laterally. It will also be noted that the outer brake disk 37 has a central line bearing against the rib 36 and consequently is also permitted to have lateral swinging play. This is of some importance because there is a variation in the amount of wear of the disks, the outer portions normally having greater wear than the inner portions, but because of the structure, it will be evident that the disks will give as the parts wear and insure surface contact throughout their extent irrespective of such wear.

Figures 17, 18, 19:
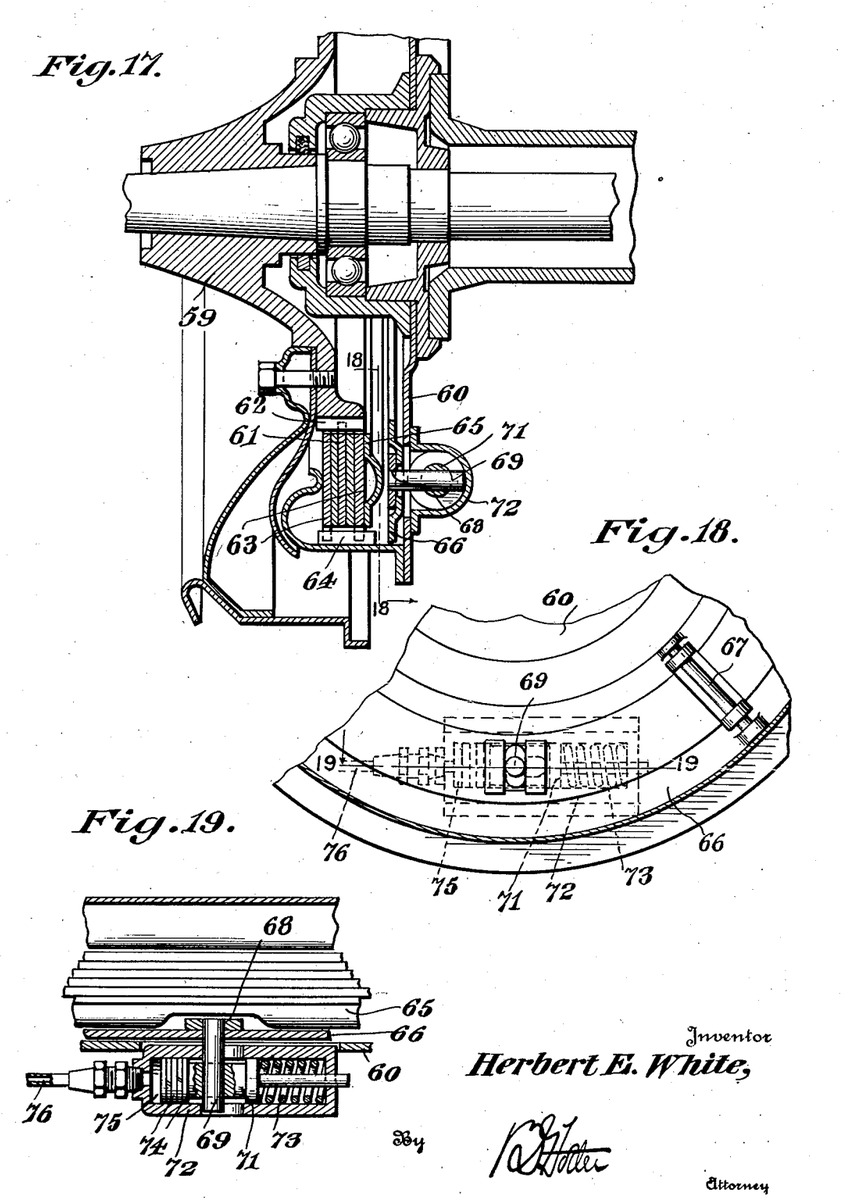
Figure 17 is a vertical sectional view through a modified form of ring operating means.
Figure 18 is a section on the line 18—18 of Figure 17.
Figure 19 is a detail cross sectional view on the line 19—19 of Figure 18.

Referring now to the modification shown in Figures 17, 18 and 19, the general structure is the same as that already described, except for the means that moves the outer actuating ring. In this form of construction the wheel hub is shown at 59, the brake housing is shown at 60, and as it corresponds in all respects to that already described, the description is not repeated. The rotating brake disk is shown at 61 and is interlocked with the wheel hub, as illustrated at 62. The stationary or non-rotatable disks are illustrated at 63 and are interlocked with the lugs 64 on the peripheral wall of the brake housing. The inner disk pressing ring is shown at 65 and is the same as the ring 44. The outer actuating ring is designated 66 and carries the rollers 67 which operate against the cams of the inner ring 65.

The ring 66 in this form of construction has a reenforced slot 68 in which is engaged a transverse pin 69 that projects beyond the rear housing wall 60 and is carried by a reciprocatory piston 71 mounted in a cylinder 72 fixed to said housing wall 60. The piston 71 is pressed in the direction to free the brake disks by a spring 73 housed in one end of the cylinder 72 and bearing against the adjacent end of the piston. The other end of the piston is provided with suitable packing rings 74 and behind said end of the piston is a chamber 75 for the reception of fluid under pressure. This fluid is conducted to the chamber 75 by a suitable supply pipe 76 leading from any suitable source and controlled by a valve, all of which it is believed is readily understood and is therefore not illustrated.

Obviously the action of this structure is the same as that already described.

Whenever fluid is admitted to the chamber 75 the piston 71 is moved, thereby carrying the ring 66 in a direction to cause the rollers to ride the cams and press the ring 65 outwardly or against the braking disks. When the fluid pressure is released the spring 73 which has been compressed reacts and returns the ring 66 to release the brake disks.

Figure 20:
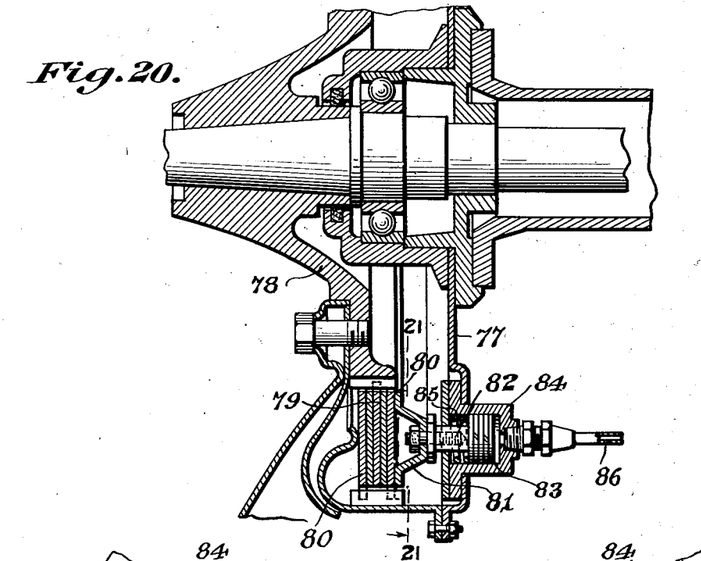
Figure 20 is a vertical sectional view through another form of disk-pressing mechanism.
Figure 21:
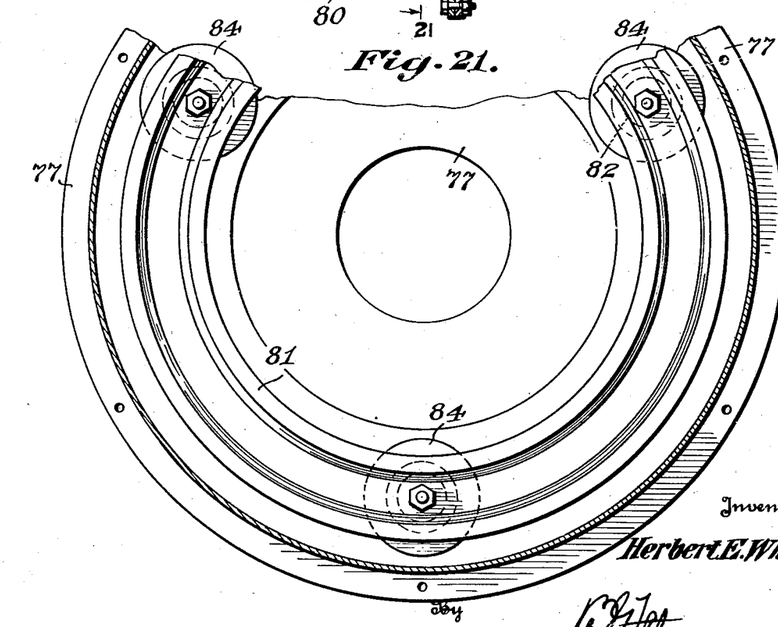
Figure 21 is a sectional view on the line 21—21 of Figure 20.

In another form of construction shown in Figures 20 and 21, the general brake structure is substantially the same, but different means is employed for pressing the brake disks together. In this structure the rear wall of the brake housing is shown at 77, the wheel hub is illustrated at 78, the brake disk that rotates with said hub, is shown at 79, the coacting non-rotating brake disks on opposite sides of the disk 79 are designated 80. Operating against the inner of these disks 80 is a channel pressing ring 81. This ring has attached to it outstanding piston rods 82 fixed to pistons 83 that are located in outstanding cylinders 84 placed at different points about the inner wall 77. The pistons 83 are moved outwardly by springs 85 behind them, and are moved inwardly by fluid under pressure conducted to the cylinders 84 behind the pistons 83 by supply pipes 86. Obviously when fluid under pressure is admitted to these pipes, the pistons 83 are forced inwardly, causing the ring 81 to press the brake disks together and create a frictional braking action between them. When this fluid pressure is released the springs 85 react and move the pressing ring 81 outwardly, again releasing the brake disks, and thus permitting the central rotating disc 79 to rotate freely with the wheel.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with a fixed support, of a wheel journaled thereon, interleaved relatively rotatable brake plates carried respectively by the support and wheel, means for pressing the plates together to create braking resistance to their relative rotation, and an abutment for said brake plates located between the inner and outer edges of both relatively rotatable plates and permitting a rocking movement of the plates to accommodate radially disposed differences in thickness of said disks.

2. The combination with a fixed support, of a wheel journaled thereon, interleaved relatively rotatable brake plates carried respectively by the support and wheel, means for pressing the plates together to create braking resistance to their relative rotation, and an abutment member for said brake plates comprising a wall having an annular inset transversely rounded rib against which one of the outermost plates bears between its outer and inner edges.

3. The combination with a brake housing including a peripheral wall and a side wall having an annular inset transversely rounded rib, of a wheel having a hub located inside the peripheral wall, a set of interleaved relatively rotatable brake disks interposed between the hub and peripheral wall and respectively interengaged therewith, one of the set having a bearing against the rounded rib, and means for forcing said disks against said rib.

4. The combination with a brake housing comprising an inner side wall, a peripheral wall and an outer side wall carried by the peripheral wall having an inset transversely rounded rib, of a wheel having a hub extending through the outer wall into the housing, a set of relatively rotatable interleaved brake disks in the housing between the hub and peripheral wall and respectively interlocked therewith, the outer of the disks having a bearing against the rib of the outer housing wall, and means extending through the inner wall for pressing said disks together and against the transversely rounded face of said rib of the outer wall.

5. The combination with an axle support, of a brake housing fixed against rotation to the support and including spaced side walls and a peripheral wall connecting the side walls, one of said walls having an inset transversely rounded bearing rib, a rotatable wheel hub extending into the housing, interleaved braking disks connected respectively to the housing and hub and laterally movable to clamp against one another, one of the outermost of the disks having a bearing between its inner and outer edges against the bead, and means for forcing the disks together and the said outer one against said bead.

HERBERT E. WHITE.